United States Patent
Grundhöfer

(10) Patent No.: US 9,560,345 B2
(45) Date of Patent: Jan. 31, 2017

(54) CAMERA CALIBRATION

(71) Applicant: Disney Enterprises, Inc., Burbank, CA (US)

(72) Inventor: Anselm Grundhöfer, Uster (CH)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/577,745

(22) Filed: Dec. 19, 2014

(65) Prior Publication Data

US 2016/0182903 A1   Jun. 23, 2016

(51) Int. Cl.
*H04N 17/00* (2006.01)
*H04N 17/02* (2006.01)
*G06T 7/00* (2006.01)

(52) U.S. Cl.
CPC ............ *H04N 17/002* (2013.01); *G06T 7/0018* (2013.01); *G06T 7/0044* (2013.01); *G06T 2207/30204* (2013.01); *G06T 2207/30244* (2013.01)

(58) Field of Classification Search
CPC ....... H04N 17/002; H04N 17/02; H04N 5/217
USPC ......................................................... 348/187
See application file for complete search history.

(56) References Cited

U.S. PATENT DOCUMENTS

| 5,865,349 A | 2/1999 | Cancilla |
| 2009/0051624 A1* | 2/2009 | Finney ................. H05B 37/029 345/30 |
| 2010/0076306 A1 | 3/2010 | Daigneault et al. |
| 2012/0327194 A1 | 12/2012 | Shiratori et al. |
| 2013/0070094 A1 | 3/2013 | Majumder et al. |
| 2015/0193920 A1* | 7/2015 | Knee ...................... H04N 5/243 382/154 |
| 2015/0341618 A1* | 11/2015 | He ..................... H04N 13/0246 348/47 |

OTHER PUBLICATIONS

David, Philip, SoftPOSIT: Simultaneous Pose and Correspondence Determination, International Journal of Computer Vision 59(3), 259-284, 2004, Kluwer Academic Publishers, The Netherlands.
Zhou, Haoyin et al., Vision-Based Pose Estimation From Points With Unknown Correspondences, IEEE Transactions on Image Processing, vol. 23, No. 8, Aug. 2014, Piscataway, United States.

* cited by examiner

*Primary Examiner* — Michael Lee
(74) *Attorney, Agent, or Firm* — Patterson + Sheridan LLP

(57) ABSTRACT

Embodiments herein include systems, methods and articles of manufacture for calibrating a camera. In one embodiment, a computing system may be coupled to a calibration apparatus and the camera to programmatically identify the intrinsic properties of the camera. The calibration apparatus includes a plurality of light sources which are controlled by the computer system. By selectively activating one or more of the light sources, the computer system identifies correspondences that relate the 3D position of the light sources to the 2D image captured by the camera. The computer system then calculates the intrinsics of the camera using the 3D to 2D correspondences. After the intrinsics are measured, cameras may be further calibrated to in order to identify 3D locations of objects within their field of view in a presentation area. Using passive markers in a presentation area, computing system may use an iterative process that estimates the actual pose of the camera.

14 Claims, 7 Drawing Sheets

CAMERA CALIBRATION

BACKGROUND

Field of the Invention

Embodiments presented in this disclosure generally relate to camera calibration and more specifically, to calculating the intrinsic characteristics and pose of a camera.

Description of the Related Art

Many applications require accurate camera calibration of the intrinsics of a camera—e.g., focal length, principal point, lens distortion parameters, and the like. A common way to identify the intrinsics of a camera is by using a checkerboard target that is captured from several different views using the camera. This method of calibration requires the checkerboard to be held at different ranges with different inclinations relative to the camera being calibrated. Thus, an untrained person will likely have trouble accurately calibrating the camera with this method. Moreover, it is often difficult to achieve a consistent level of calibration accuracy over a variety of calibrations being carried out by different people who may use different checkerboards that are arranged at different positions and orientations.

SUMMARY

One embodiment described herein is a calibration system that includes a calibration apparatus comprising a plurality of light sources. The calibration system also includes a computing system communicatively coupled to the light sources. The computing system includes a calibration module configured to selectively control the light sources to determine 3D to 2D correspondences relating 3D locations of the plurality of light sources in space to locations in a 2D image captured by a camera and determine intrinsic properties of the camera using the 3D to 2D correspondences.

Another embodiment described herein includes a method for calibrating a camera. The method includes receiving an image captured by the camera, the image comprising a scene with a plurality of passive markers and where the passive markers are disposed in the scene in a non-repeating arrangement. The method also includes estimating pose values of the camera by correlating 3D locations of the plurality of passive marks in space to 2D locations of the plurality of passive markers in the image.

Another embodiment described herein includes a computer program product for calibrating a camera, the computer program product includes a computer-readable storage medium having computer-readable program code embodied therewith. The computer-readable program code is configured to receive an image captured by the camera, the image comprising a scene with a plurality of passive markers where the passive markers are disposed in the scene in a non-repeating arrangement. The computer-readable program code is also configured to estimate pose values of the camera by correlating 3D locations of the plurality of passive marks in space to 2D locations of the plurality of passive markers in the image.

Another embodiment described herein includes a system that includes a presentation area comprising a plurality of passive markers where the passive markers are disposed in the presentation area in a non-repeating arrangement. The system also includes a camera arranged such that a field of view comprises the plurality of passive markers and a computing system configured to estimate a pose of the camera based on an image captured from the camera that comprises the plurality of passive markers.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 2:
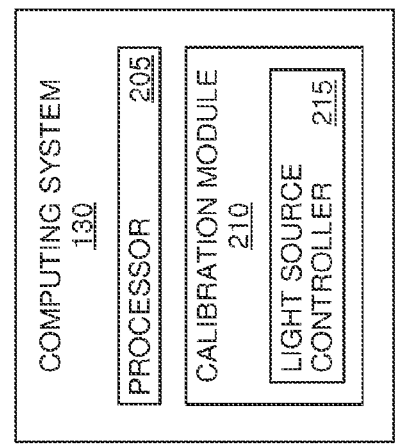
FIG. 2 is a computing system for calibrating the camera, according to one embodiment described herein.

Embodiments described herein provide an automated system for measuring the intrinsics of a camera. The system includes a calibration apparatus which has a fixed spatial relationship relative to the camera. In one embodiment, once the calibration apparatus is moved into the field of view of the camera, the calibration is performed without the calibration apparatus having to be repositioned or reoriented whether by a human or mechanical means. The calibration apparatus includes a plurality of light sources (e.g., LEDs) which are controlled by a computing system. By selectively activating one or more of the light sources, the computing system determines the 2D location of the light sources in the images captured by the camera. Using this information, the computing system identifies correspondences that relate the known 3D positions of the light sources in space to the 2D locations in the image captured by the camera (referred to herein as 3D to 2D correspondences). The computer system then calculates the intrinsic properties of the camera using the 3D to 2D correspondences.

After the intrinsics are measured, a camera may be further calibrated in order to identify its pose using 3D locations of objects within a field of view of the camera that captures a scene of a presentation area (e.g., a stage, screen, etc.). In one embodiment, active markers (e.g., LEDs) may be placed in the presentation area or on objects within the area and then be selectively controlled by a computing system. By turning on and off these active markers, the computing system can correlate the 3D location of the markers to 2D locations within the images captured by the camera. Using these correspondences, the computing system can estimate the pose of the camera (e.g., its translation and rotation in 3D space). However, using active markers is expensive and time consuming. For instance, the markers are spaced around the presentation area and wiring is run to communicatively couple the markers to the computing system so the marker can be turned on and off.

Instead of using active markers that are turned on and off programmatically, the embodiments herein disclose a technique for estimating the pose of a camera using passive markers. As used herein "passive" markers refers to markers that are not controlled by logic which selectively turns on and off the markers. Non-limiting examples of passive markers includes light sources which are not selectively turned on and off, retro reflective paint markers, fluorescent paint markers, thermochromic paint, photochromic paint, and the like. Instead of capturing a plurality of images, the camera may capture only one image that includes 2D locations for multiple passive markers. The computing system may use an iterative process (e.g., a search algorithm) that estimates the actual pose of the camera. In one embodiment, the computing system may also generate one or more parameters that narrow down the possible pose values (e.g., the translation and rotation of the camera) that are searched. For example, the location of the camera may be measured to provide a rough estimate of the translation and rotation of the camera, or, if the camera is replacing an old camera, the pose values of the old camera may be used to provide a rough estimate for pose values of the new camera. Using the one or more parameters, the computing system may be able to estimate the pose of the camera faster than attempting to estimate the pose without the parameters.

An Active Calibration Apparatus to Measure Intrinsics

Figure 1:
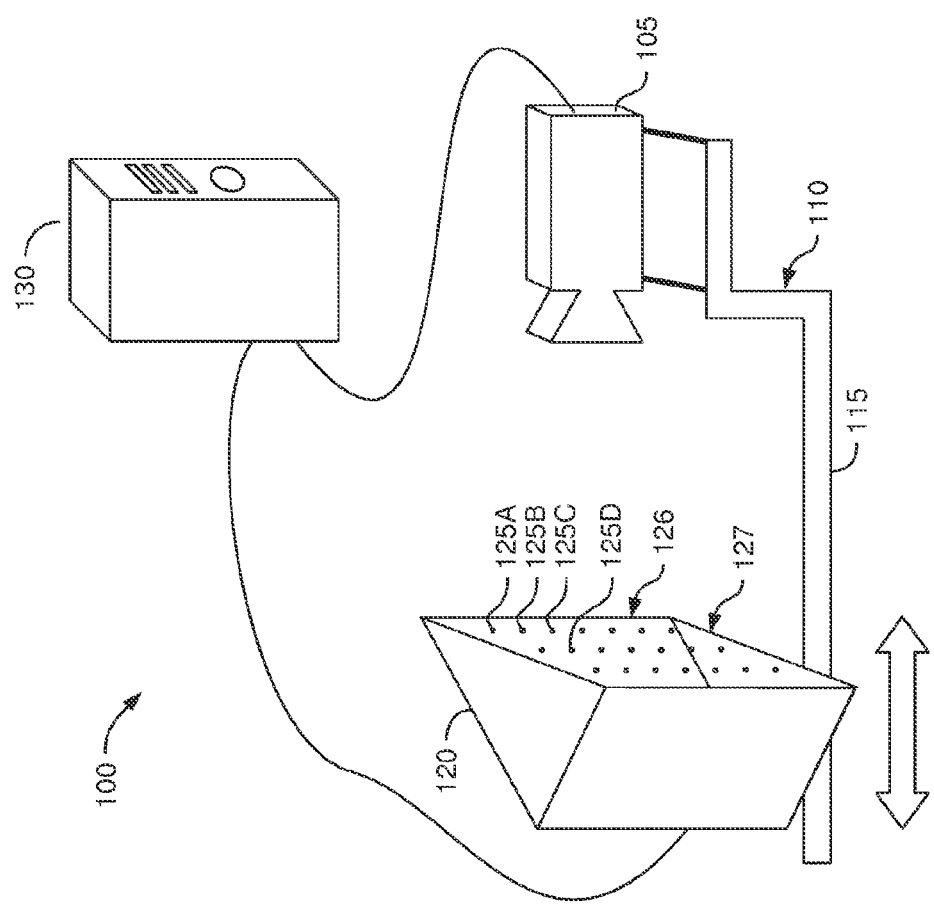
FIG. 1 is an automated system for calibrating a camera, according to one embodiment described herein.

FIG. 1 is an automated system 100 for calibrating a camera 105, according to one embodiment described herein. The camera 105 may be any type of camera (e.g., image, thermal, depth, etc.) which has a 2D image sensor sensitive to electromagnetic radiation of a specific range of wavelengths—e.g., visible light, infrared, ultraviolet, etc—where the intrinsics of the camera have not been previously measured. In addition to camera 105, the system 100 includes a mount 110, calibration apparatus 120, and computing system 130. As shown, the camera 105 and calibration apparatus 120 are both attached to the mount 110 which fixes the spatial relationship between the camera 105 and the apparatus 120. The mount 110 also includes a rail 115 which attaches to the calibration apparatus 120. The rail 115 may include visual marks that indicate the location on the rail 115 the calibration apparatus 120 should be attached. For example, it may be desired to position the calibration apparatus 120 such that the apparatus 120 takes up most if not all of the field of view of the camera 105. Because different cameras 105 have different field of views (e.g., a fish eye lens versus a standard lens) different camera configurations may correspond to different marks on the rail 115. By knowing the configuration of the camera 105, a person can quickly identify the location on the rail 115 to place the calibration apparatus 120 such that the apparatus 120 is properly located within the field of view of the camera 105.

In one embodiment, the calibration apparatus 120 is moveable along the rail 115. For example, the calibration apparatus 120 may slide along the rail 115 in order to change the distance between the apparatus 120 and the camera 105 thereby changing the location of the apparatus 120 in the field of view of the camera 105. In one example, the calibration apparatus 120 and mount 110 may be a single, portable unit that can be attached to different cameras that may have different configurations. Further still, in one embodiment, the mount 110 may be motorized such that the mount 110 adjusts the location of the calibration apparatus 120 relative to the camera 105 in response to a control signal. For example, the mount 110 may include a belt that slides the apparatus 120 along the rail 115. Once a technician attaches the mount 110 and calibration apparatus 120 to a pre-installed camera 105, the computing system 130 can send commands to mount 110 to move the calibration apparatus 120 along the rail 115 until the apparatus 120 is at the desired position in field of view of the camera 105. For example, the computing system 130 may monitor the images captured by the camera 105 and move the calibration apparatus 120 until the apparatus 120 takes up the majority of the field of view. In this example, the technician does not need to actually move the calibration apparatus 120 but only attaches the mount 110 to the camera 105 and ensures the computing system 130 is communicatively coupled to the camera 105.

In other embodiments, the camera 105 and calibration apparatus 120 may not be attached to the same mount 110. Although during calibration the spatial relationship between camera 105 and calibration apparatus 120 remains substantially fixed relative to each other, this may be achieved by other means besides mount 110 such as placing the apparatus 120 on a stationary object (e.g., a tripod) or by a person holding the apparatus 120 in a fixed location during calibration. Regardless of the technique used to maintain the spatial relationship between the calibration apparatus 120 and the camera 105, unlike when checkerboards are used, the calibration apparatus 120 does not need to be repositioned or reoriented.

The calibration apparatus 120 includes a plurality of light sources 125 arranged on apparatus 120. In one embodiment, 3D locations of the light sources 125 relative to each other are known by the computing system 130. For example, each light source 125 may be assigned a Cartesian coordinate in 3D space according to some reference point. For instance, light source 125A may be assigned as the reference point and given the coordinates (0, 0, 0), while light source 125B is assigned (0, 1, 0) and light source 125C is assigned (0, 2, 0). Each light source 125 may be assigned a corresponding 3D location which defines its spatial relationship relative to the other light sources 125 on the calibration apparatus 120. Furthermore, instead of using a light source 125 as the reference point, a different point may be used such as the geometric center of the apparatus 120 or a corner of the apparatus 120.

As shown, the light sources 125 are arranged at different distances away from the camera 105 (e.g., different depths). For example, as measured along the same axis, light source 125C is closer to the camera 105 than light source 125D. That is, the light sources 125 may be arranged on different depth planes relative to the camera 105. Moreover, the light sources may be arranged on different sub-portions of an inner surface of the calibration apparatus 120. As shown, the light sources 125 are located on both a side surface 126 and a bottom surface 127 of the apparatus 120. However, as shown in the front view provided in FIG. 4, light sources 125 may also be located on a top surface and the other side surface of the calibration apparatus 120. The light sources 125 may be disposed anywhere on the inner surface of calibration apparatus 120—e.g., the side surfaces, top surface, bottom surface, etc.

The light sources 125 may be LEDs, OLEDs, light bulbs, and the like. For example, the type of the light sources 125 varies depending on the particular wavelength the camera 105 is sensitive to—e.g., visible light LEDs are used with picture cameras while infrared LEDs are used with some types of depth cameras. The light sources 125 may directly mounted on the calibration apparatus 120 at the desired locations or may use, for example, optical fiber to output the light at the desired location. For instance, the apparatus 120 may include an array of LEDs mounted on its backside while respective optical fibers are used to carry and output the light emitted by the LEDs at the location of the light sources 125 shown in FIG. 1. In one embodiment, the calibration apparatus 120 may include tens, hundreds, or thousands of light sources 125 arranged in a predefined configuration such that the light emitted from the light sources 125 is within the field of view of camera 105. Further still, in one embodiment, the plurality of light sources 125 are point light sources which generate the appearance of a small point of light (e.g., an LED or end of an optical fiber). Doing so may make it easier to estimate a pixel location of the light source in the 2D image compared to using large light sources (e.g., incandescent light bulbs).

The computing system 130 includes a data communication path to both the calibration apparatus 120 and the camera 105. Via the communication path to the apparatus 120, the computing system 130 controls the light sources 125 such as selectively turning on and off each light source 125 or a group of light sources 125. In addition, the computing system 130 may control the intensity of the light sources 125. As such, the calibration apparatus 120 may be referred to as an "active" calibration apparatus since the number of illuminated light sources changes during the calibration process.

The computing system 130 also receives images captured by the camera 105. As will be described in more detail below, the computing system 130 correlates the location of the light source 125 in the image (or images) captured by the camera 105 (i.e., a 2D location in the image) to the 3D location of the light source 125 on the calibration apparatus 120. These 3D to 2D correspondences may then be used to calculate the intrinsics of the camera 105. Once the intrinsics of the camera 105 (and its pose) are known, the camera 105 may be used along with another calibrated camera to derive accurate position of objects in 3D space that are within the fields of view of the cameras. In one example, the 3D locations of the objects may be used by a projector to display an image on the objects or may be used to stitch together images to create a panoramic image where the intrinsic information is used to remove distortion from the images.

FIG. 2 is a computing system 130 for calibrating the camera, according to one embodiment described herein. The system 130 includes a processor 205 and a calibration module 210. The processor 205 represents an ASIC, single processor, or multiple processors which each may include one or more processing cores. The calibration module 210 may be software, hardware, or a combination of both which determines the 3D to 2D correspondences by selectively controlling the light sources on the calibration apparatus and identifying the location of the light sources in the images captured by the camera. Calibration module 210 includes a light source controller 215 for turning off and on the light sources in the calibration apparatus. By knowing which light sources are on, the calibration module 210 can scan an image captured by the camera to identify the location of the light sources in the camera. In one embodiment, the calibration module 210 can control the settings of the camera 105 such as changing its exposure time to, for example, improve the contrast between the light sources emitting light and the rest of the captured image.

Figure 3C:
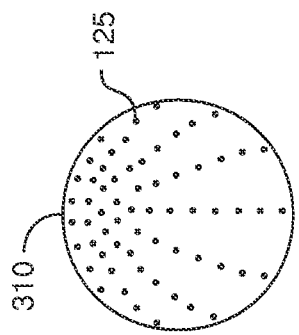
FIGS. 3A-3C illustrate various calibration apparatuses, according to embodiments described herein.
Figure 3B:
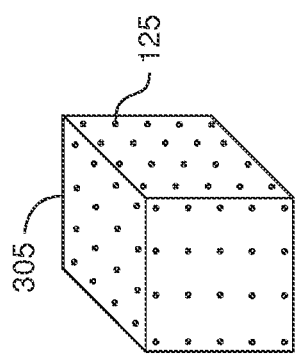
Figure 3A:
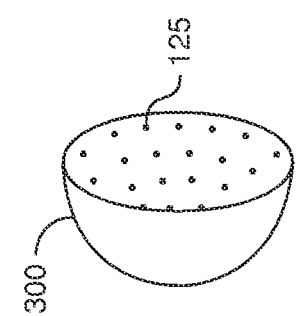

FIGS. 3A-3C illustrate various calibration apparatuses, according to embodiments described herein. In FIG. 3A, the calibration apparatus 300 is a half-sphere which includes light sources 125 arranged on a curved inner surface. Thus, like calibration apparatus 120 shown in FIG. 1, here the inner surface of apparatus 300 also includes a plurality of different planes on which the light sources 125 are disposed. As described above, the 3D locations of the light sources 125 relative to each other may be known. In some embodiments, the half-sphere calibration apparatus 300 may provide better angles to enable the camera (which would face the inner surface) to detect light emitted by all the light sources 125. That is, the spherical apparatus 300 does not include ninety degree angles like the half-cubical apparatus 120 shown in FIG. 1 where the camera may have difficulty detecting the light emitted from the light sources 125 arranged at the bottom or top of the apparatus 120. Moreover, although apparatus 300 is spherical, in another embodiment, the apparatus 300 may have an elliptical shape.

FIG. 3B illustrates a calibration apparatus 305 shaped as a cube. Unlike in the calibration apparatuses discussed above, this apparatus 305 is a full 3D object rather than a cutaway where the light sources 125 are mounted on an inner surface. Calibration apparatus 305 may include a wire frame or transparent surfaces on which the light sources 125 are mounted rather than used a solid surface. Thus, even if the camera is facing a first side of apparatus 305, the camera may be able to detect light sources 125 mounted on a second, opposite side of the apparatus 305 (assuming the light sources on both sides are arranged to emit light towards the camera).

FIG. 3C illustrates a calibration apparatus 310 shaped as a full sphere instead of the half-sphere apparatus 300 shown in FIG. 3A. The apparatus 310 may include a wire frame or transparent surface on which the light sources 125 are mounted so that a camera can detect light emitted from light sources that are on an opposite side of the apparatus 310. FIGS. 3B and 3C are only two examples of suitable full 3D shapes for the calibration apparatuses. Other suitable shapes include an ellipsoid, pyramid, and the like.

Figure 4:
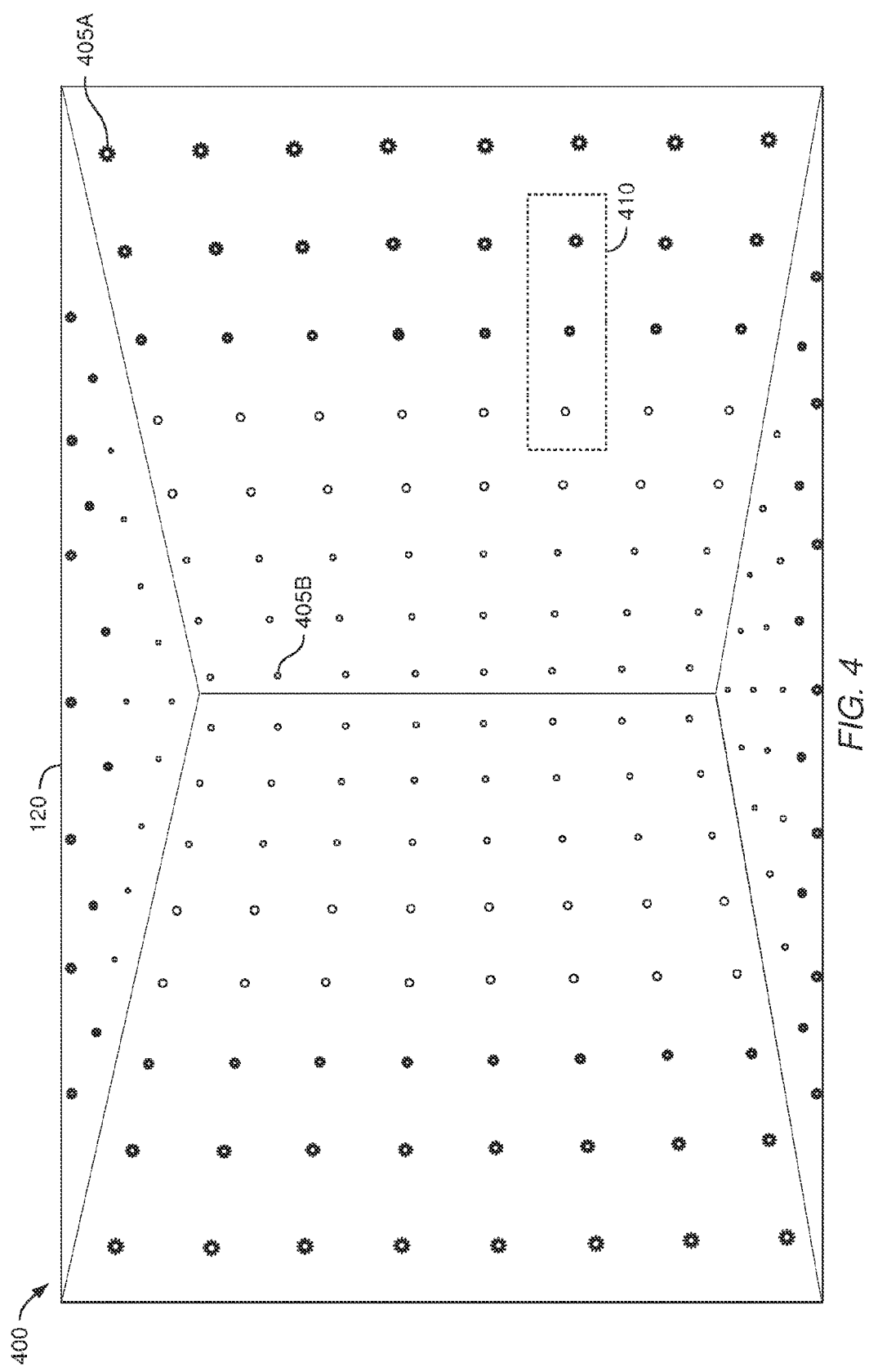
FIG. 4 illustrates a view of a calibration apparatus from the perspective of the camera, according to one embodiment described herein.

FIG. 4 illustrates a view of the calibration apparatus 120 captured by the camera, according to one embodiment described herein. FIG. 4 includes the field of view 400 of the camera 105 in FIG. 1. As shown, the inner surface of the calibration apparatus 120 takes up the majority, if not all of the field of view 400. Although the accuracy of the calibration may be improved if the calibration apparatus takes up substantially all of the field of view 400 of the camera, it is not a requirement. The calibration apparatus may take up, for example, only half of the field of view 400 of the camera and still be used to derive 3D to 2D correspondences that are sufficiently accurate.

For illustration reasons, FIG. 4 illustrates the image captured by the camera when all the light sources 405 are turned on. However, depending on the technique used when performing calibration, only a subset of the light sources (e.g., one or more) may be on at the same time rather than all of the light sources. FIG. 4 also illustrates that it is not necessary that all of the light sources 405 be in focus in the captured image. In this embodiment, the light sources are the same size (e.g., 1-4 mm in diameter) but the areas in the image corresponding to the light sources (e.g., the black dots) are not the same since one light source may be in focus while another is out of focus. For example, in this image, light source 405A is out of focus as can be seen by the larger black area relative to the light source 405B which is more in focus, and thus, has a smaller black dot.

In one embodiment, the calibration apparatus 120 may include alignment indicators that enable the system to detect when the apparatus 120 takes up substantially all of the view of the camera. For example, the computing system 130 in FIG. 1 may monitor that images captured by the camera 105 as a technician moves the calibration apparatus 120 within the field of view 400 (e.g., slides the apparatus along the rail 115). Once the alignment indicators are detected in a predefined location of the image, the computer system 130 may provide the technician with audio or video feedback to let her know the calibration apparatus 120 is in the desired location relative to the camera.

Figure 5:
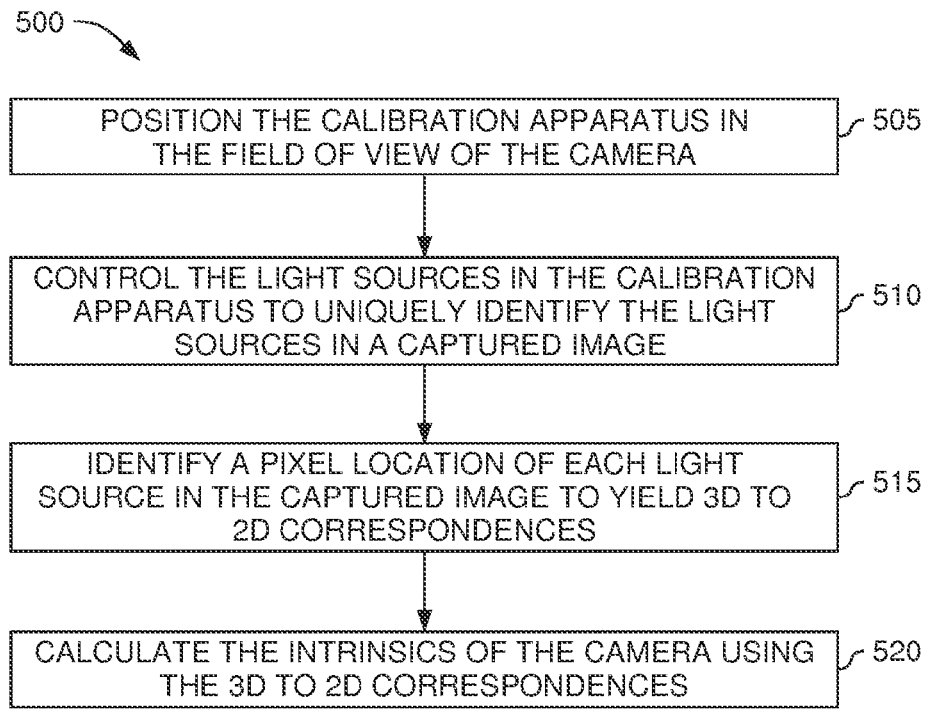
FIG. 5 is a method for calculating the intrinsics of the camera, according to one embodiment described herein.

FIG. 5 is a method 500 for calculating the intrinsics of the camera, according to one embodiment described herein. At block 505, the calibration apparatus is position within the field of view of the camera. This may be performed by a technician or programmatically using a motorized mount. However, because the calibration apparatus may be an active alignment tool (e.g., selectively turning on and off one or more light sources) rather than a passive alignment tool such as a checkerboard, the calibration apparatus does not need to be moved during the calibration process (e.g., block 510).

At block 510, the calibration module controls the light sources on the calibration apparatus to uniquely identify the light sources in an image captured by the camera. In one embodiment, the calibration module turns on only one light source on the calibration apparatus and turns off the other light sources. The calibration module evaluates the image captured when only the single light source is illuminated. The calibration module can then correlate the 3D location of the light source to the 2D location of the detected light in the captured image. This process can then be repeated for all other light sources on the calibration apparatus.

In another embodiment, the calibration module may use a temporal binary coding to selectively activate the light sources on the calibration apparatus. Instead of activating each light source individual, the temporal binary coding permits groups of the light sources (e.g., a half or quarter of the total number of the light sources) to be activated simultaneously. This requires less images, and thus, may perform calibration in a shorter amount of time. Further still, the calibration module may be able to uniquely identify a 2D location of each light source using only one captured image. For example, the light sources may be arranged in recognizable pattern or each light source may correspond to a different wavelength (color) of light thereby permitting the light sources to be identified in the image. Regardless of the technique used, at block 510, the calibration module identifies a region in the image (e.g., one or more pixels) that corresponds to each of the light sources in the calibration apparatus.

In one embodiment, the calibration module may change a setting of the light sources or the camera in order to improve the ability of the module to detect the location of the light sources in the captured images. For example, if a particular light source is not detected, the calibration module may increase the intensity of the light source or change the exposure time of the camera. In one embodiment, the calibration module may store a plurality of default values that control the different settings of the camera. Before performing block 510, the calibration module may configure the camera using the default values.

At block 515, the calibration module identifies a pixel location of each light source in the captured image to yield the 3D to 2D correspondences. As used herein, the pixel location refers to a specific pixel in the 2D images that corresponds to a light source captured by the camera if the camera had an infinite number of pixels. This point may also be referred to as the center of gravity. Method 500, however, is not limited to any particular technique for calculating the pixel location but rather may use a variety of different algorithms. For example, using the image or images captured during block 510, the calibration module may weight the intensity measured at a plurality of pixels. Pixels where the measured light intensity is the highest are given a greater weight while the pixels where the measured light intensity is the lowest are given less weight. The total intensity is then summed and divided by the number of pixels considered in order to estimate the precise pixel location associated with the light source. In another embodiment, the pixel locations may be estimated by calculating the 2D Laplacian of a Gaussian distribution which also indicates the center of gravity of the plurality of pixels that capture the light source. Furthermore, the calibration module may use black image subtraction to remove the influence of other external light source by capturing a first image without any of the lights sources turned on and subtract this image from the other captured images where at least one light source is turned on. This optional process may improve the ability of the module to detect the light sources.

After the pixel locations for all the light sources are determined, the calibration module now includes 3D to 2D correspondences for all the light sources. That is, the 3D location of the light source relative to the other light sources in the calibration apparatus (which may be expressed in Cartesian coordinates) is assigned to the specific 2D pixel location to yield the 3D to 2D correspondences.

Figure 6:
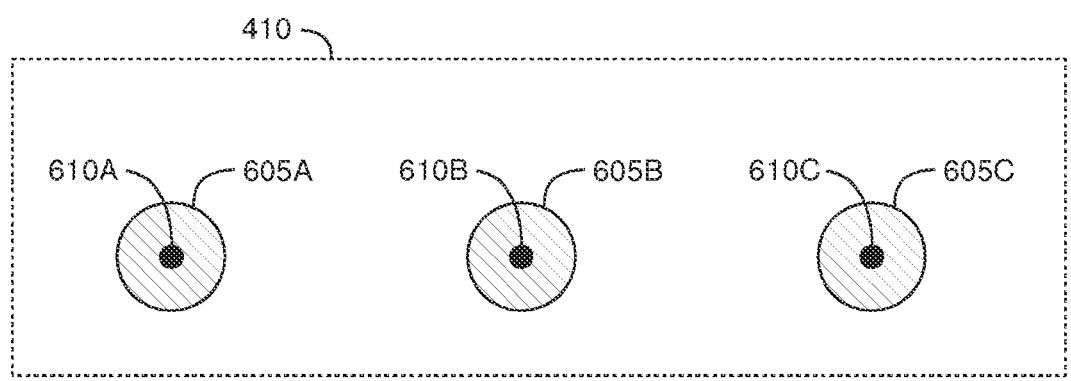
FIG. 6 illustrates pixel locations in a captured image corresponding to light sources, according to one embodiment described herein.

FIG. 6 illustrates pixel locations in a captured image corresponding to light sources, according to one embodiment described herein. Specifically, FIG. 6 illustrates the portion 410 of the image captured in FIG. 4 that includes three light sources. The regions 605A, 605B, and 605C include pixels that detect light emitted from the corresponding light sources. As discussed above, the pixels in each region 605 (and a portion of the surrounding region of the captured image) may be weighted and summed in order to identify the precise pixel locations 610A, 610B, and 610C. As shown, the pixel locations 610 are approximately in the middle of the regions 605 although this may vary depending on the accuracy of the technique used to calculate the pixel locations 610. Because the calibration module selectively controls the light sources, and thus, can identify which light source corresponds to which pixel region 605, the calibration module can also assign the pixel locations 610 to the light sources to generate the 3D to 2D correspondences.

Returning to method 500, at block 520, the calibration module calculates the intrinsics of the camera (e.g., estimate focal length, principal point, lens distortion parameters, and the like) using the 3D to 2D correspondences. Method 500 is not limited to any particular technique for calculating the values of the intrinsics of the camera. For example, the calibration module may use direct linear transform to generate an initial estimate of some of the intrinsic values and then use non-linear parameter optimization minimizing the geometric reprojection errors to accurately estimate further parameters and refine the initial, estimated values. In other embodiments, the calibration module may use further refinements, such as data normalization, or minimization of the algebraic error.

In one embodiment, a method similar to method 500 may be used to calibrate a projector that projects an image rather than a camera that detects an image. For example, instead of the calibration apparatus including light sources, the apparatus may include light detectors at the same locations. By changing where the projector projects light, the calibration module can map the 2D projection plane of the projector to the 3D locations of the detectors on the calibration apparatus. Further still, if LEDs are used, the same calibration apparatus can be used both to calibrate cameras (e.g., when LEDs are forward biased they are light sources) and calibrate projectors (e.g., when LEDs are reversed biased they are light detectors).

Estimating a Pose of a Camera Using Passive Markers

Figure 7:
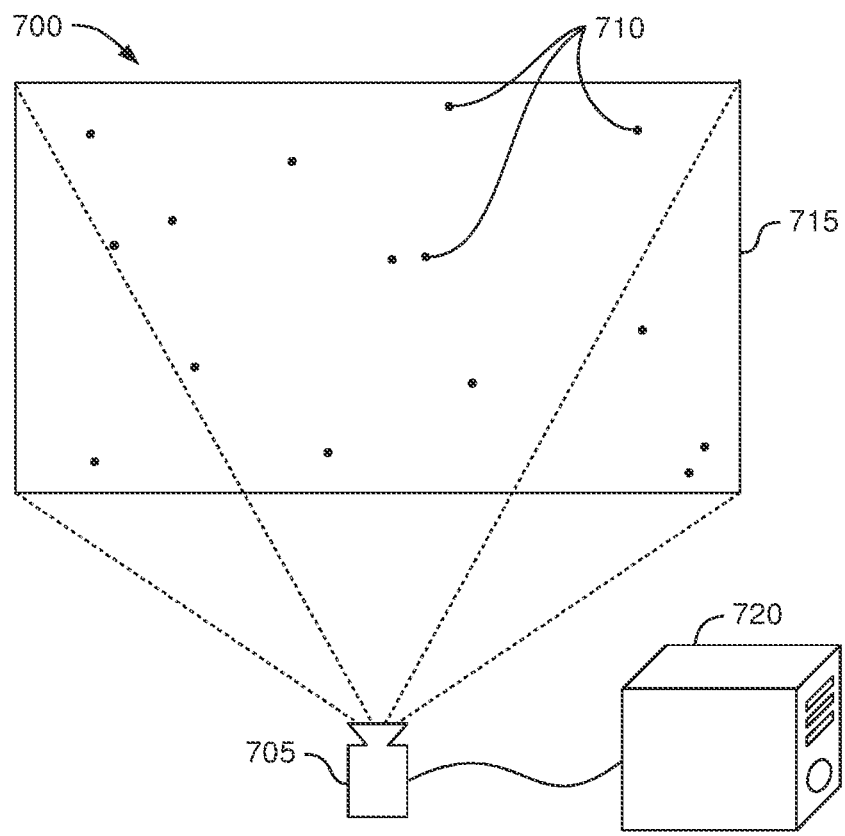
FIG. 7 illustrates a system for calibrating a camera using passive markers, according to one embodiment described herein.

FIG. 7 illustrates a system 700 for calibrating a camera 705 using passive markers 710, according to one embodiment described herein. The system 700 includes camera 705, a plurality of passive markers 710, and a computing system 720. As shown, the camera 705 includes a field of view 715 which includes a plurality of the markers 710. That is, the 2D images captured by the camera includes a plurality of 2D locations that correspond to the 3D locations of the markers 710 in the field of view 715. In one embodiment, the 3D locations of the markers 710 relative to a common reference point are already known (e.g., a Cartesian coordinate system with an arbitrary reference point). However, the system 700 does not know which 2D location of light source in an image captured by camera 705 corresponds to which 3D location of the markers 710.

The markers 710 are passive which means they are not selectively controlled by logic such that, at a given time, one or more of the markers 710 are on (or active) while the remaining markers 710 are off (or inactive). Moreover, the passive markers 710 are arranged without using a repetitive pattern (i.e., a non-repeating arrangement or a non-repeating pattern) such that the spatial locations of any particular marker(s) 710 do not provide spatial information about any other markers 710 relative to one another. Stated differently, in one embodiment, a technician arranges the markers 710 in system 700 such that each markers 710 has a relative location with respect to the other markers 710 that is unique. For example, the passive markers 710 may be arranged randomly or without the use of a repetitive pattern (e.g., a grid) within a presentation area in a scene. By not arranging the markers 710 in a repetitive pattern, the computing system 720 may be able to more easily distinguish which markers 710 are in the field of view 715 of the camera 705. For example, a presentation area may have additional markers 710 which are not in the field of view 715. However, using different spatial relationships between the markers 710, the computing system 720 may be able to match the location of the markers 710 captured by camera 705 to a particular portion of the presentation area. Because the computing system 720 already knows the arrangement of the markers 710 in the presentation area, the system 720 can compare the arrangement of the markers 710 in the field of view 715 to identify what portion of the presentation area is within the field of view 715 since the arrangements of the markers 710 may be unique. However, if a repeated pattern was used to place the markers 710, then one portion of the pattern may look the same as another portion of the pattern (i.e., have the same arrangement of markers 710), and thus, the computing system 720 would be unable to distinguish which portion of the markers 710 is within the camera's field of view 715.

In one embodiment, the passive markers 710 are light sources (e.g., LEDs) that are either all on or all off. For example, system 700 may include a switch that turns the light sources on or off. When the camera 705 is being calibrated, a technician or the computing system 720 may switch on the light sources. However, during a presentation, the LEDs may be turned off so that the markers are imperceptible to a viewer. As used herein, "imperceptible" means that the markers 710 are generally unnoticeable to viewer who is viewing the presentation area with her naked eye at a desired distance. Imperceptible does not necessarily mean the markers are completely invisible to the naked eye and may depend on distance. For example, if the viewer is twenty feet from the markers 710, the markers may be imperceptible but if the viewer is one foot from the markers 710 she may be able to identify the markers 710. Because a presentation area, e.g., a stage, may keep the viewer from getting any closer than twenty feet from the markers 710, it may be irrelevant that the markers 710 are perceptible at one foot so long as they are imperceptible at twenty feet.

In one example, the field of view 715 may be a portion of a presentation area (e.g., theater stage or projector screen) that displays a live or recorded performance. When the computing system 720 is not calibrating the camera 705, the light sources may be turned off (e.g., when viewers are in the presentation area) to not affect the viewer's experience. Alternatively, the light sources may be infrared LEDs or other light sources that emit radiation that is undetectable to the human eye. The camera 705, however, may be configured to detect the radiation. In this example, the light sources could always be on regardless of whether a viewer is in the presentation area or not since the radiation emitted by the light sources cannot be seen by the human eye. In this case, the system 700 may not need to have a switch that activates and deactivates the light sources.

In another embodiment, the passive markers 710 may be retro reflective paint markers. These reflective markers may be illuminated using ring lights mounted around the camera 705. Moreover, the retro reflective markers are generally imperceptible to the human eye under most conditions unless the viewer uses a flash to take a picture or has a flashlight pointed at a retro reflective marker. When the camera is being calibrated, the ring lights are turned on. However, during a presentation, the ring lights may be turned off so the retro reflective markers are imperceptible to the viewers.

In another embodiment, the passive markers 710 may be luminous paint (e.g., fluorescent paint) markers that are applied to the surface or surfaces within the field of view 715. To capture the location of these markers in the captured images, the markers 710 glow when wavelengths of light corresponding to the particular type of luminous paint used by the markers 710 is emitted. Typically, ultraviolet light frequencies cause the luminous paint to glow thereby illuminating the markers 710 in the captured image. Thus, by emitting the ultraviolent light, the markers 710 may emit more reflected light than the surrounding portions of the field of view 715 which is captured by the camera 705.

In another embodiment, the passive markers 710 may be thermochromic paint makers that changes color in response to changes in temperature. For example, at room temperature, the thermochromic paint markers may be imperceptible to the human eye. For example, the color of the markers 710 may be the same or similar as the color of the surface or surfaces on which they are disposed. However, when the camera 705 is calibrated, the temperature of the markers 710 is changed thereby changing the color of the makers 710 such that they no longer blend in with the color of their surroundings, and thus, are detectable in the images captured by the camera 705. For example, the temperature of the entire presentation area may be increased or the temperature of the markers 710 may be increased by activating a heat lamp or space heater. Once the image containing the markers 710 is captured, the temperature may be reverted back to the original temperature such that the markers 710 are again imperceptible to a viewer.

In another embodiment, the passive markers 710 may be photochromic paint markers which changes color when subjected to a certain wavelength of radiation. However, when radiation with the corresponding wavelength is not striking the marker, the photochromic paint marker is a different color. The photochromic paint markers may have the same color as their surrounding region when they are not being subjected to the radiation with the corresponding wavelength so that the markers blend in with their surroundings and are imperceptible to a viewer. However, when calibrating the camera 705, an emitter may be used to subject the photochromic paint markers with the corresponding wavelengths which change the color of the markers relative to their surroundings. This color contrast can then be captured by the camera 705 and used to identify a position of the markers 710 in the captured image.

The marker examples discussed above (e.g., light sources, reflective paint, fluorescent paint, thermochromic paint, and photochromic paint) are configured to be imperceptible to a viewer who is looking at the field of view 715. For example, when viewers are in the room, the light sources are turned off, or when a presentation is occurring, the lights illuminating the reflective paint are turned off. In this manner, the passive markers 710 may be imperceptible to a human viewer at desired times—e.g., when there are viewers in the presentation area or when a performance is occurring. The dimensions of the passive markers 710 may depend on the distance between the markers 710 and the camera 705 as well as the distance between the markers 710 and a viewer. For example, the passive markers 710 may be of sufficient dimensions to be clearly distinguishable by the camera 705 but as small as possible to avoid being noticed by a viewer.

Although as little as four of the passive markers 710 may be used to calibrate the pose of the camera 705, having additional passive markers 710 in the field of view 715 increases the accuracy of the calibration—e.g., provides a more accurate estimation of the pose of the camera 705. The total number of passive markers 710 in system 700 may depend on the size of the presentation area, the size of the fields of view of the cameras, the viewability of the markers (e.g., whether some markers are occluded at some angles), and the like.

Figure 8:
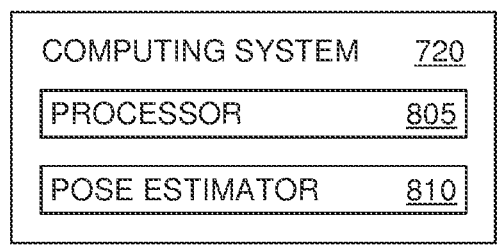
FIG. 8 is a computing system for performing pose estimation, according to one embodiment described herein.

FIG. 8 is the computing system 720 which performs pose estimation, according to one embodiment described herein. The computing system 720 includes a processor 805 and pose estimator 810. The processor 805 represents an ASIC, a single processor, or multiple processors which each may include one or more processing cores. The pose estimator 810 may be software, hardware, or a combination of both which estimates the pose of a camera based the location of the passive markers captured in an image taken by the camera. The details of how the pose estimator 810 determines the pose—e.g., the translation and rotation of the camera—will be discussed later in FIG. 10.

Figure 9:
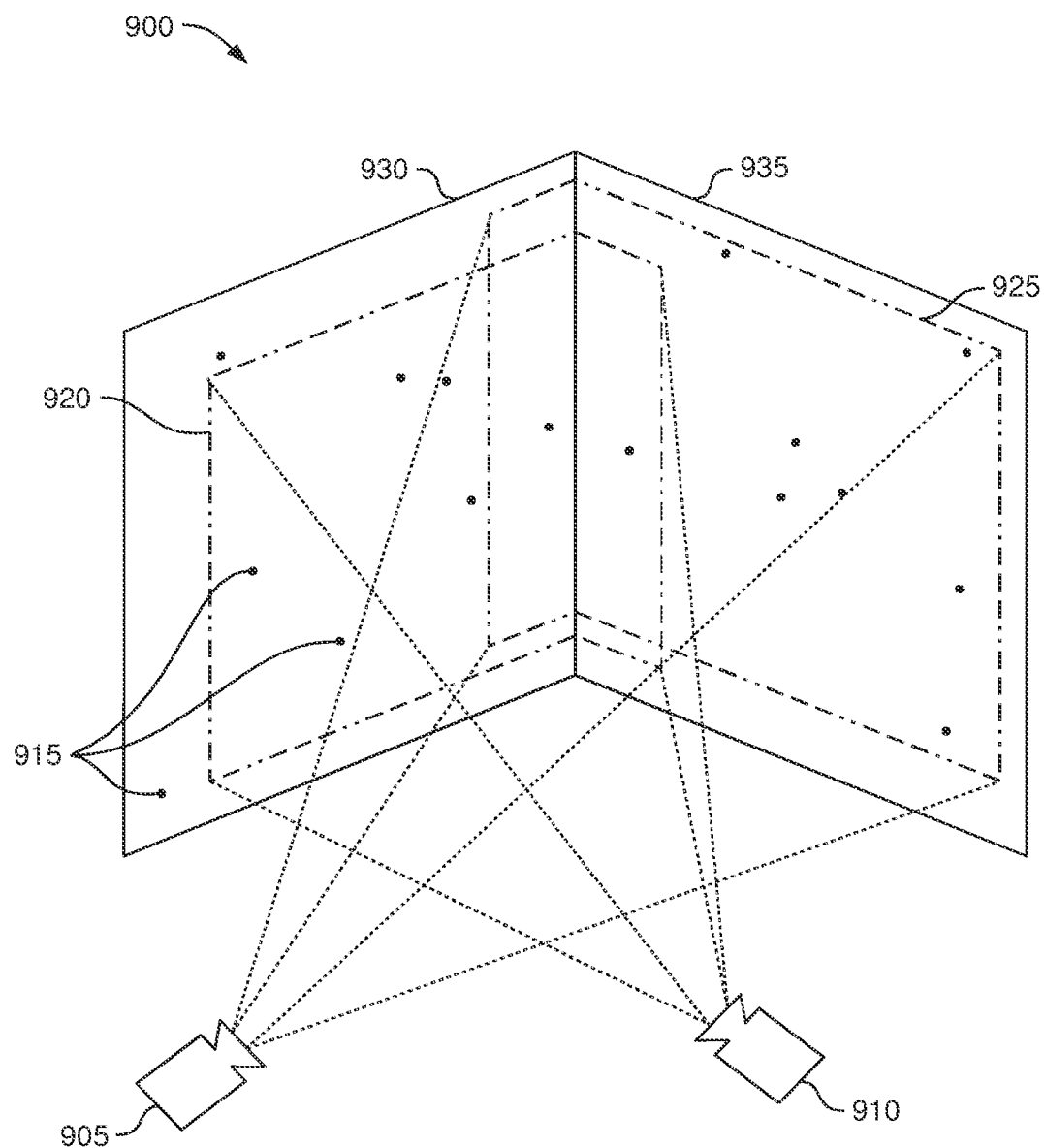
FIG. 9 illustrates a system for calibrating multiple cameras using passive markers, according to one embodiment described herein.

FIG. 9 illustrates a system 900 for calibrating multiple cameras using passive markers, according to one embodiment described herein. System 900 includes cameras 905 and 910 that have respective fields of view 920 and 925. As shown, camera 905 captures images that include field of view 925 while camera 910 captures images that include field of view 920. System 900 also includes two surfaces 930 and 935 on which the passive markers 915 are disposed. Moreover, the fields of view 920 and 925 extend onto both surfaces 930, 935.

System 900 illustrates that the passive markers 915 may be used to calibrate multiple cameras which may have the same or different field of views. For example, the field of view 925 for camera 905 covers at least one passive marker 915 that is also within the field of view 920 for camera 910. Nonetheless, the cameras 905 and 910 may be calibrated at the same time which may not be possible if activate markers are used instead. Like in system 700, the passive markers 915 in system 900 may be arranged on the surfaces 930 and 935 without using a predefined pattern (e.g., arranged randomly) so that the spatial relationships between the markers 915 are not predetermined. As such, the field of views 920 and 925 may include unique arrangements of the passive markers 915 which enable the pose estimator to determine which of the plurality of markers 915 are currently within the fields of view 920 and 925 of the cameras 905 and 910 and which are not.

Figure 10:
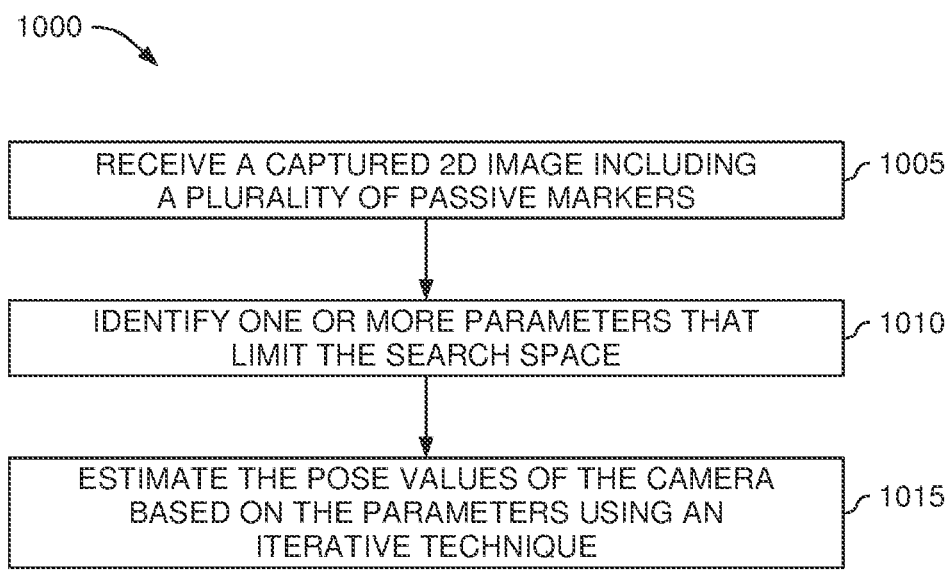
FIG. 10 is a method for performing pose estimation using passive markers, according to one embodiment described herein.

FIG. 10 is a method 1000 for performing pose estimation using passive markers, according to one embodiment described herein. At block 1005, the pose estimator receives a captured 2D image taken from a camera that includes a plurality of passive markers. Because the markers are passive, the pose estimator does not know the 3D to 2D correspondences. That is, the pose estimator cannot yet correlate a 2D location of a marker in the captured image to particular one of the markers. The pose estimator uses method 1000 to estimate the 3D to 2D correspondences in order to estimate the pose of the camera. In one embodiment, method 1000 performs pose estimation using only one captured image from the camera. In contrast, when active markers are used, multiple images may be captured from the camera and used to derive the 3D to 2D correspondences and perform pose estimation.

In one embodiment, the passive markers may be located on a featureless surface which may be a planar surface without color distinction. In another embodiment, the markers may be placed on different objects or surfaces that are space different distances away from the camera. Regardless of the different arrangements of the passive markers, as long as a sufficient number of the markers are captured within the field of view of the camera, the pose estimator is able to determine the pose of the camera. Furthermore, the passive markers may be arranged without using a pattern such that the spatial relationships between the passive markers are unique and non-repeating. Moreover, in method 1000 it is assumed that the intrinsics of the camera are already known. For example, the intrinsics of the camera may have been calculated using the method 500 in FIG. 5 or any other method which yields the intrinsics of the camera.

At block 1010, the pose estimator identifies one or more parameters that limit a search space used to identify the pose of the camera. Because the pose estimator may use a search algorithm (e.g., a minimization technique) for estimating the pose of the camera, the parameters may be used to narrow down the search space which may reduce the time needed to estimate the pose. In some systems, the pose estimator may be unable to determine a solution for the pose of the camera without first narrowing the search space. However, in other systems, the pose estimator may be able to identify the pose of the camera without using any parameters to limit the possible pose values.

In one embodiment, method 1010 may be performed when a new camera replaces an old camera. Because the general location of the new camera may be similar to the location of the old camera, the pose values of the old camera may be a parameter used to limit the possible pose values of the new camera. For example, the new camera may be installed on the same mount as the old camera. Thus, the translation and rotational values of the old camera may be used as rough estimates or guides when estimating the translation and rotational values of the new camera. In one example, the pose estimator may use some offset of the pose of the old camera to limit the possible pose values of the new camera—e.g., the values of the new camera are expected to differ from the translation and rotational values of the old camera only by a specific percentage.

In one embodiment, the pose estimator may weight the different markers in order to reduce the search space. Again assuming method 1010 is used to estimate the pose of a new camera that is being placed in a similar position as an old camera, the pose estimator may weight the passive markers according to which markers where within the field of view of the old camera. The passive markers within the center of the field of view of the old camera may be given a greater weight than passive makers at the periphery. Furthermore, the markers just outside the field of view of the old camera may be assigned a lesser weight than the markers at the periphery of the field of view but a greater weight than markers that are further away from the field of view. By knowing the weight of the markers, the pose estimator may be able to more accurately or more quickly identify which of the passive markers are included within the field of view of the new camera, and thus, identify the 3D to 2D correspondences.

In another embodiment, the pose values of the camera are measured by, for example, a technician. These measured values may provide a rough estimate which limits the search space. For example, the pose estimator may assume that the actual pose values do not differ by more than 15% from the measured values, thereby limiting the search space.

In one embodiment, the pose estimator is able to eliminate some of the passive markers as being possible markers within the captured 2D image. The eliminated markers may also be used as parameters that limit the search space. For example, a technician may inform the pose estimator that some of the passive markers (e.g., markers on a particular surface) are behind the camera or are occluded from the camera's view, and thus, cannot be the markers captured in images taken with the camera. Another example to eliminate occluded or out of frustum passive markers would be a simulation with a given orientation estimate and a known geometry. The pose estimator can then eliminate the markers identified using these techniques as potential markers within the captured image and instead focus on matching the 2D locations in the image to different markers in the presentation area.

At block 1010, the pose estimator uses one or more of the different parameters discussed above (or similar parameters) to narrow the search space. The parameters may reduce the number of possible markers that are within the view of the camera or reduce the possible pose values of the camera.

At block 1015, the pose estimator determines the pose values of the camera based on the one or more parameters using an iterative technique. In one embodiment, the pose estimator also determines the 3D to 2D correspondences between the passive markers in the camera's field of view and the 2D locations on the captured image.

The pose estimator may use a minimization technique to estimate the pose of the camera. Based on the parameters identified in block 1010, the pose estimator identifies an initial estimate of the translation and rotational values of the camera. The pose estimator may then change these values incrementally to generate a virtual image (using the intrinsics of the camera) and determine how the 3D markers would project on the virtual image. The pose estimator compares the difference of the 3D markers projected onto the virtual image with the 2D locations of the markers on the actual captured image. If the differences are greater than a predefined threshold, the pose estimator again varies the translation and rotational value and generates a new virtual image. This process may repeat until the locations of the markers in the virtual image are sufficiently close (i.e., within the predefined threshold) to the location of the markers in the actual image, thereby identifying the 3D to 2D correspondences between the passive markers and the locations of the markers in the image. Moreover, the particular translation and rotational values used to generate the virtual image that sufficiently matches the actual image are then identified as the corresponding pose values of the camera.

Other minimization techniques that may be used to estimate the pose of a camera using passive markers are described in "Vision-Based Pose Estimation From Points with Unknown Correspondences," H. Zhou, T. Zhang, and W. Lu, IEEE Transactions on Image Processing, August 2014 and "SoftPOSIT: Simultaneous Pose and Correspondence Determination," P. David, D. Dementhon, R. Duraiswami, and H. Samet, Int. J. Comput. Vis., vol. 59, no. 3, pp. 259-284, September 2004. These publications are incorporated by reference in their entirety. The selection between which of these techniques to use in order to estimate the 3D to 2D correspondences and the pose of the camera may depend on the particular configuration of the system.

In the preceding, reference is made to embodiments of the invention. However, it should be understood that the invention is not limited to specific described embodiments. Instead, any combination of the above features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:
1. A calibration system, comprising:
   a calibration apparatus comprising a plurality of light sources, wherein the plurality of light sources is arranged on a surface of the calibration apparatus, wherein the surface includes a plurality of differently arranged planes; and
   a computing system communicatively coupled to the light sources, the computing system comprising a calibration module configured to:
      selectively control the plurality of light sources to determine 3D to 2D correspondences relating 3D physical locations of the plurality of light sources in space to locations in a 2D image captured by a camera, and determine intrinsic properties of the camera using the 3D to 2D correspondences.

2. The calibration system of claim 1, wherein a first light source of the plurality of light sources is a first distance from the camera along a reference axis and a second light source of the plurality of light source is a second, different distance from the camera along the reference axis.

3. The calibration system of claim 1, further comprising a mount coupled to the calibration apparatus, wherein the mount is configured to couple to the camera in order to fix a spatial relationship between the calibration apparatus and the camera.

4. The calibration system of claim 3, wherein the calibration apparatus is moveably attached to the mount such that a distance between the calibration apparatus and the camera can be adjusted.

5. The calibration system of claim 1, wherein selectively control the plurality of light sources to determine 3D to 2D correspondences further comprises:
receiving a plurality of 2D images from the camera, wherein the calibration module is configured to control the plurality of light sources such that one of: (i) a different one of the plurality of light sources and (ii) a different grouping of the plurality of light sources is turned on during each of the plurality of 2D images, wherein a spatial relationship between the calibration apparatus and the camera is constant when each of the plurality of 2D images is captured by the camera.

6. The calibration system of claim 1, wherein the calibration module is configured to identify the 3D locations of the plurality of light sources relative to a reference point associated with the calibration apparatus.

7. The calibration system of claim 1, wherein the calibration module is configured to identify pixel locations in the 2D image corresponding to the plurality of light sources by weighting an intensity of light measured by pixels in the 2D image.

8. A method for calibrating a camera, the method comprising:
selectively controlling a plurality of light sources using a computing system communicatively coupled to the light sources to determine 3D to 2D correspondences relating 3D physical locations of the plurality of light sources in space to locations in a 2D image captured by the camera, wherein the plurality of light sources are mounted on a calibration apparatus in view of the camera, and wherein the plurality of light sources is arranged on a surface of the calibration apparatus, wherein the surface includes a plurality of differently arranged planes; and
determining intrinsic properties of the camera using the 3D to 2D correspondences.

9. The method of claim 8, wherein a first light source of the plurality of light sources is a first distance from the camera along a reference axis and a second light source of the plurality of light source is a second, different distance from the camera along the reference axis.

10. The method of claim 8, further comprising:
adjusting the spatial relationship between the calibration apparatus and the camera using a mount coupled to both the calibration apparatus and the camera.

11. The method of claim 10, wherein the calibration apparatus is moveably attached to the mount such that a distance between the calibration apparatus and the camera can be adjusted.

12. The method of claim 8, wherein selectively controlling the plurality of light sources to determine 3D to 2D correspondences further comprises:
receiving a plurality of 2D images from the camera, wherein the plurality of light sources are controlled such that one of: (i) a different one of the plurality of light sources and (ii) a different grouping of the plurality of light sources is turned on during each of the plurality of 2D images, wherein a spatial relationship between the calibration apparatus and the camera is constant when each of the plurality of 2D images is captured by the camera.

13. The method of claim 8, further comprising:
identifying the 3D locations of the plurality of light sources relative to a reference point associated with the calibration apparatus.

14. The method of claim 8, further comprising:
identifying pixel locations in the 2D image corresponding to the plurality of light sources by weighting an intensity of light measured by pixels in the 2D image.

* * * * *